United States Patent

[11] 3,603,078

[72] Inventors Phillip D. Schwiebert
 Glencoe;
 Ivar H. Norinder, Mundelein, both of, Ill.
[21] Appl. No. 823,710
[22] Filed May 12, 1969
[45] Patented Sept. 7, 1971
[73] Assignee MacLean-Fogg Lock Nut Co.
 Mundelein, Ill.

[54] COUPLING LINK ASSEMBLY
 4 Claims, 12 Drawing Figs.
[52] U.S. Cl. ................................. 59/85,
 59/93
[51] Int. Cl. ................................. F16g 13/06
[50] Field of Search ........................ 59/85, 86,
 93

[56] References Cited
 UNITED STATES PATENTS
 418,812  1/1890  McIntire ................ 59/85
 547,642  10/1895  King .................... 59/86
 2,369,344  2/1945  Ehmann ................. 59/86
 3,330,107  7/1967  Klein ................... 59/86

Primary Examiner—Charles W. Lanham
Assistant Examiner—Gene P. Crosby
Attorney—Davis, Lucas, Brewer & Brugman ABSTRACT: A two-part coupling link constituting a pair of identical members, desirably forged, each of U-shape having a flattened portion on the end of one arm which forms a collar with an opening elongated longitudinally of the arm, and on the remaining arm of which member is a stud which projects outwardly in a direction away from said opening and in concentric relationship thereto. An integral flange on the outer end of the stud has a shape and size for passage through said opening when properly oriented and which is elongated along an axis angularly related to that of the opening. The members are brought together to be joined while in angularly related and opposed dispositions for the insertion of the flange and stud of one member in the opening of the other, and after which the members are extended from one another at dispositions which displace the flange elongations from those of the openings to prevent separation of the members in use and effectively stiffen the members against distortion under extreme loads. An auxiliary clip which grasps sides of one member and has a finger extending into the elongated opening may be used to prevent inadvertent disengagement of the members when not in use.

PATENTED SEP 7 1971
3,603,078
SHEET 1 OF 2
FIG. 2
FIG. 1
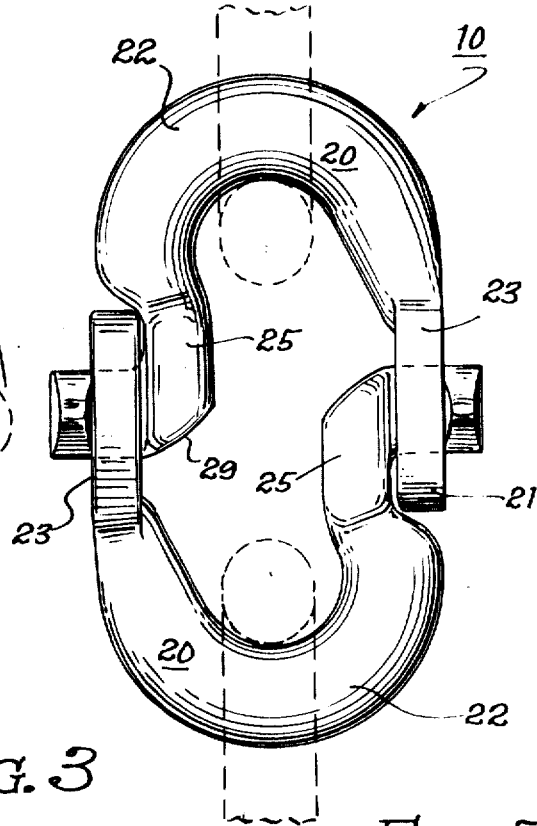
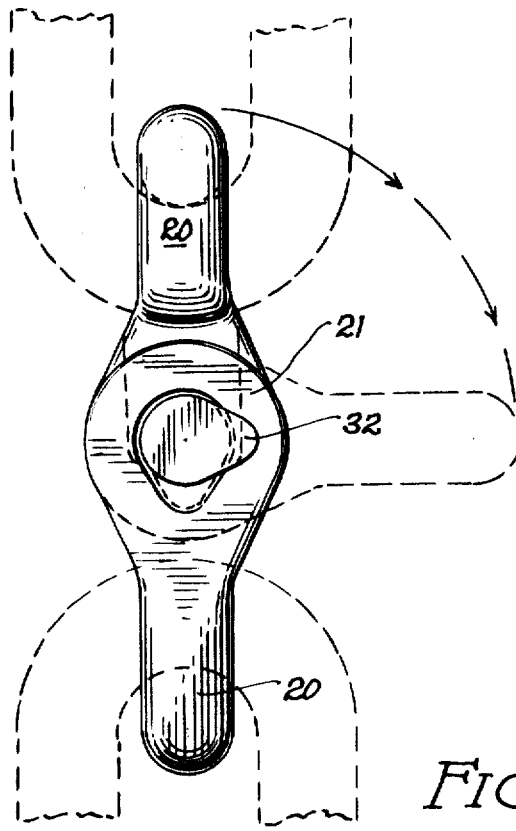
FIG. 3
FIG. 4
FIG. 5
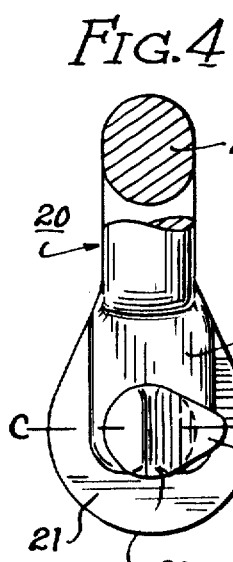
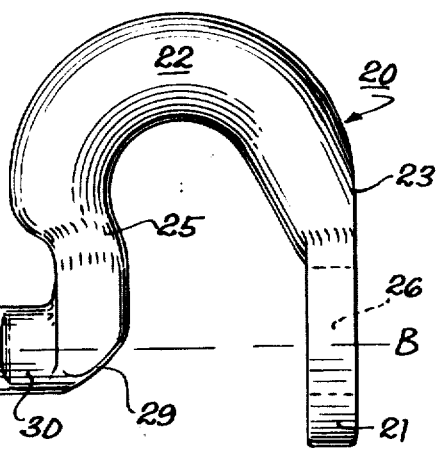
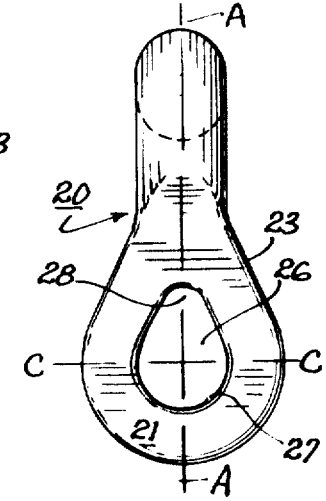
FIG. 6
INVENTORS
Phillip D. Schwiebert
Ivar H. Noringer
by Davis, Lucas, Brewer
and Brugman
Att'ys

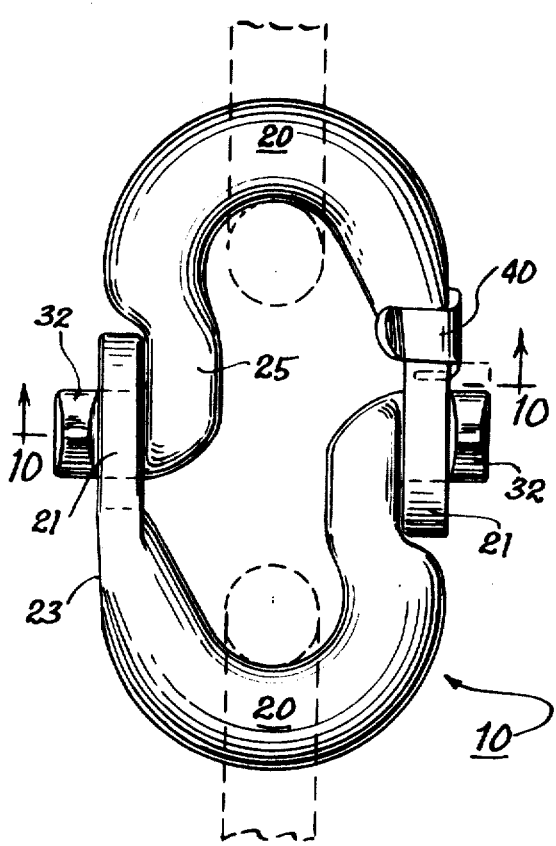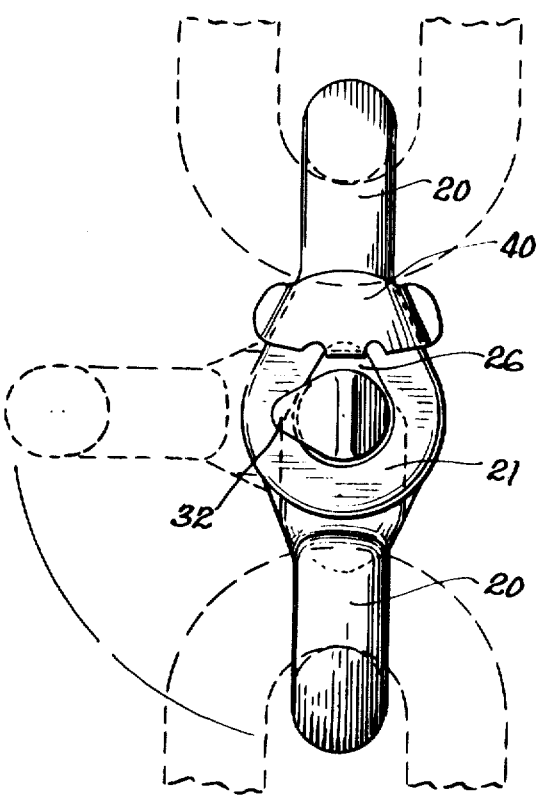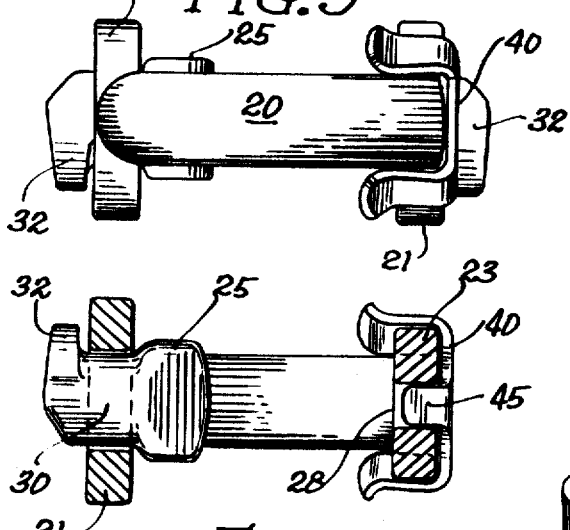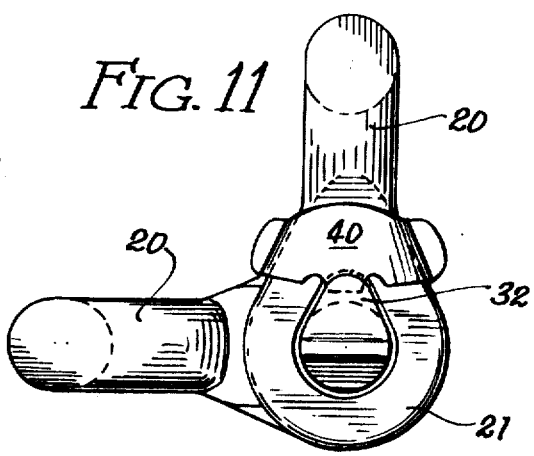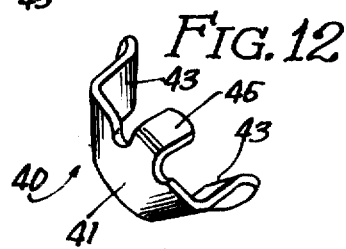

COUPLING LINK ASSEMBLY

BACKGROUND OF THE INVENTION

This invention relates generally to chain links, and more particularly, to a two-part coupling link therefor.

In the past, a large number of various coupling links have been developed. Generally, they have had two main link parts; however, most all of them have included impractical, expensive, unwieldy or complex means of joining the parts together. In many, a spacer was required at the juncture of the parts, which divides the interior of the link in two. Such spacers are cumbersome and add to the cost and of the links, in addition to complicating the fastening parts and the assembly and disassembly of the link parts. As an example, see U.S. Pat. No. 2,827,890, issued June 10, 1958, to C. F. Morill.

SUMMARY OF THE INVENTION

Therefore, to provide what is considered to be a more practical and economical coupling link, and to overcome the foregoing and other difficulties of the prior art, the general object of this invention is to provide a new and improved coupling link having two parts which are simply and easily joined, and also which obviates the necessity of a spacer at the juncture of the parts for imparting rigidity to the assembly for handling heavy loads. To this end, the present invention teaches a link formed by a pair of identical forged members adapted to assembly in inverse relationship to one another, and each of a generally U-shape, including a flattened portion on an end of one side arm which, having an opening therein, forms a collar, the opening in which is elongated longitudinally of the arm, and the other of which side arms has an outwardly projecting stud thereon at a position directly opposite the opening and substantially concentric thereto. An integral over hanging flange on the outer end of the stud is elongated in shape and of a size to pass through the collar opening of another member when the members are in angularly related planes. The links are assembled by orienting the members in angular and inverse disposition relative to one another for insertion of the flanges and studs into the openings, respectively, each of the other, and then relatively swinging the members to extended disposition approaching a common plane to displace the axes of elongation of the flanges and openings relative to one another so that each stud is retained in its opening by the flange at the end thereof. A clip member may then be utilized to grasp sides of one collar to position an extending finger into the elongated opening, thereby to prevent subsequent disengagement.

Thus, one of the objects of this invention is to provide a coupling link structure of adequate strength and rigidity which obviates the need for a spacer at the juncture of a two-part coupling link.

It is an object of this invention to provide a simplified juncture for members of a coupling link which minimizes the number of parts required.

Another object of this invention is to provide a two-part coupling link which is readily joined together and taken apart.

The invention has for another object the provision of a durable, two-part coupling link of adequate strength and rigidity which is economical to produce from readily available materials and from a minimum number parts that each lend themselves to standard mass-production manufacturing techniques.

As another object this invention has within its purview a two-part coupling link in which the members are simply and easily joined and in which inadvertent disengagement may be prevented by a simple manually applied clip.

Further and other objects, and a more complete understanding of the invention may be had by referring to the following description and claims, taken in conjunction with the accompanying drawings:

DESCRIPTION OF THE DRAWINGS

For the purpose of illustrating the invention, there is shown in the drawings, a form which is presently preferred, it being understood, however, that this invention is not necessarily limited to the precise arrangements and instrumentalities there shown.

FIG. 1 is a plan view of a two-part coupling link shown with the two members thereof joined and extended for the connection of elements shown in phantom.

FIG. 2 is a side view of the link assembly shown in FIG. 1, with a phantom showing of the members at an angular disposition suitable for effecting engagement or disengagement therebetween.

FIG. 3 is a plan view of a single one of the identical members utilized in making up the link assembly of FIG. 1.

FIG. 4 is a side view, partially in section, of structure shown in FIG. 3.

FIG. 5 is a side view from the side opposite that of FIG. 4.

FIG. 6 is a bottom view of the member shown in FIG. 3.

FIG. 7 is a plan view of a coupling link identical to that of FIG. 1, but which includes a clip member for preventing unintentional disengagement of the assembled members.

FIG. 8 is a side elevation of the structure depicted in FIG. 7.

FIG. 9 is a bottom view of the coupling link of FIG. 7.

FIG. 10 is a cross-sectional view taken as indicated by lines 10—10 of FIG. 7.

FIG. 11 is a side view of the link of FIG. 7 with the members in angled disposition.

FIG. 12 is a perspective view of an individual clip member of the type embodied in FIGS. 7 to 11, inclusive.

DETAILED DESCRIPTION

Referring now to the drawings in detail, wherein like numerals indicate like elements, there is shown in FIG. 1, an illustration of a two-part coupling link 10 which constitutes the subject matter of the present invention. Two identical members 20 which are desirably forged, are joined together to make up the coupling link 10. Each of the members 20 is of generally U-shape, including a curved body portion 22 and a pair of integral and substantially parallel arms 23,25 extending from opposite ends of the curved body. The arm 23 is somewhat flattened, as shown in FIGS. 3 and 5, and has an elongated opening 26 therein to form a collar 21. The opening 26 has a semicircular outer portion 27 and an innermost elongated lobe portion 28, as shown in FIG. 5. Although the elongation could be in any direction, it was found desirable for improved strength characteristics that the elongation be along the longitudinal axis A—A (FIG. 5) of the arm 23.

It may be observed, with reference to FIG. 3 in particular, that the remaining arm 25 has thereon an outwardly extending integral stud 30 which is directly opposite and coaxial, along axis B—B (FIG. 3), with the semicircular portion of the elongated opening 26. The stud 30 is of circular cross section having a diameter corresponding to that of the semicircular portion 27 of the elongated opening 26. At its outer end the stud 30 has a flange 32 providing a lobe extension which corresponds in shape and size to the lobe portion 28 of the elongated opening 26. It may be observed that the flange 32 extends from one side of the stud 30 along axis C—C (FIG. 4), which is in substantially right angular relationship with respect to the elongation of opening 26 along the axis A—A, respectively. Other angles could be chosen; however, the 90° angle is found to be most suitable for maintenance of the assembled relationship of the members in use and for providing added strength to the coupling link. The arm 25 of each disclosed link member is offset inwardly a distance accommodating the thickness of collar 21, as shown in FIGS. 1 and 3. Arm 25 is generally rectangular in cross section, as shown in FIG. 6, and has a transverse width greater than body portion 22 for additional strength. The inside of arm 25 is rounded at 29 to provide unrestricted and free movement of adjoining links therein.

With reference to FIGS. 7 through 12, the coupling link 10 is shown in combination with a removable clip means 40 to prevent disengagement. This removable clip member 40 is shown in detail at FIG. 12. Clip 40 as herein disclosed, is stamped from a metallic sheet stock which is formed into the shape shown for grasping exterior sides of one collar 21. The shape includes a body 41, and outwardly extending arm members 43. The body is of a shape corresponding to that of the inner end portion of the collar 21 and the arms are inclined slightly outwardly and terminate in rounded outward tips, allowing easy manual application of the clip to the link member to be retained thereon by curvature of the arm members 43. A finger 45 of the clip extends downwardly and inwardly from the body 41 for extension into the lobe portion 28 of elongated opening 26. With this arrangement of parts, the elongation of opening 26 is restricted to prevent removal of the flange 32 from a respective collar 21 when the clip is applied to the coupling link assembly.

When it is desired to join identical members 20 to form the assembled coupling link 10, they are placed at angled disposition, in respect to each other, as indicated in FIGS. 2, 8 and 11. In the embodiment shown the angular disposition of the link members is substantially 90°, wherein the flanges 32 may be inserted through the openings 26, respectively, of each member, for reception of the stud 30 within the collar 21. Then the members 20 are extended to their opposed 180° disposition for use which displaces the flanges 32 with respect to the lobe portions 28 of openings 26. This provides retension of the studs 30 within the collars 21. Uncoupling is easily accomplished by reverse process. All can be accomplished manually, without the necessity of tools.

If desired, the assembly of the link members may be locked by application of clip 40. Clip 40 is manually placed on one collar 21 and pressed on, the outwardly inclined arms 43 spread slightly and are curved to securely grasp onto the collar 21. Finger 45 projects into lobe portion 28 of opening 26 (FIGS. 7 and 11) and assists in holding the clip on. Furthermore, as clearly indicated at FIGS. 8 and 11, the finger restricts opening 26 and prevents removal of the studs 30 from the collars 21. Removal of clips 40 is manually accomplished by prying back on the rounded lips of arms 43.

In addition to serving to maintain the assembled relationship of the link members, the flange lobes have another and very important function in the disclosed structure and relationship of parts. That is, under extreme loads exerted through the coupling link is use, the stress provides forces which tend to cause the link members to distort or collapse along the axis B—B (FIG. 3) and the studs 30 have a tendency to bend relative to their respective arms. Some structures of the prior art utilize spacers between the arms of the link members to combat these tendencies. However, this restricts the open space of the link and adds parts and complications to the assembly. In the disclosed structure, the presence of the flange lobes not only resists the tendency of the studs to bend relative to their respective arms, but also very materially limits the tendency of the link members to collapse or distort laterally under extreme loads, so that spacers and the like between the arms in the assembly are not necessary.

The present invention, as is of course understood, may be embodied in other specific forms without necessarily departing from the spirit or potential attributes thereof.

We Claim:

1. A coupling link comprising: a pair of identical link members, each of a generally U-shape including a curved body portion and pair of integral and substantially parallel arms extending from opposite sides thereof, one of said arms having a flattened portion forming a collar with an elongated opening therein, the remaining of said arms having an integral outwardly extending stud thereon which has at its outer end a flange of elongated shape providing a lobe projecting laterally of the axis of the stud and corresponding generally in size and shape to that of said opening, said identical members being joined to form said link by insertion of said flange and stud of each through said opening of the other, respectively, the relative dispositions of the elongations of said openings and the projecting flange lobes being such that in the normal extended positions of the link members in use, the flange lobes overlap said collars to retain the link members in assembled relationship and rigidify the link members against distortion under extreme loads, said opening being elongated along the longitudinal axis of said one of said arms and said flange being elongated so that the lobe thereof projects outwardly along an axis at an angle to the axis of said remaining arm so that insertion of the flange lobe through said opening requires angular disposition of said link members with respect to one another whereupon extension of the link members to generally coplanar disposition in use displaces said elongated flange with respect to said elongated opening, said opening having an outermost semicircular portion and an innermost lobe elongation relative to said one of the arms, said stud being of circular cross section received by said semicircular portion of said opening with said flange providing a lobe extension at one side of said stud and projecting laterally of said remaining arm, said stud portion extending completely through said collar with said flange lobe of each stud overhanging said collar of the other link member, respectively, in said generally planar disposition of the link members, and removable means to prevent disengagement of said members by effectively reducing the internal side of said elongated opening, said means comprising a clip member having a finger projection extending into said lobe portion of said opening.

2. A coupling link in accordance with claim 1, wherein said clip is formed from sheet metal and includes clamping arms which grasp opposed sides of said collar.

3. A clip member for retention together of two identically formed coupling link members joined by insertion of a flanged stud into an elongated opening in a collar, said clip comprising: a formed metallic sheet having outwardly arms for grasping outer opposed sides of said collar and having means which extends into said elongated opening adjacent said stud to retain said flanged stud in said elongated opening.

4. The clip member of said claim 3, wherein said means is an integral finger extending into said elongated opening.

PO-1050
(5/69)

UNITED STATES PATENT OFFICE
CERTIFICATE OF CORRECTION

Patent No. 3,603,078          Dated     September 7, 1971

Inventor(s)  Phillip D. Schwiebert and Ivar H. Norinder

It is certified that error appears in the above-identified patent and that said Letters Patent are hereby corrected as shown below:

IN THE PATENT:

Col. 1, line 17, "2,827,890" should be --2,837,890--;

Col. 3, line 46, "is" should be --in--;

IN THE CLAIMS:

Col. 4, line 8, "a" should be inserted before "pair".

Signed and sealed this 8th day of February 1972.

(SEAL)
Attest:

EDWARD M. FLETCHER, JR.          ROBERT GOTTSCHALK
Attesting Officer                Commissioner of Patents